(12) United States Patent
Alexander

(10) Patent No.: US 6,487,294 B1
(45) Date of Patent: Nov. 26, 2002

(54) SECURE SATELLITE COMMUNICATIONS SYSTEM

(76) Inventor: Paul F. Alexander, 8704 Victory La., Potomac, MD (US) 20854

(*) Notice: Subject to any disclaimer, the term of this patent is extended or adjusted under 35 U.S.C. 154(b) by 0 days.

(21) Appl. No.: 09/264,867

(22) Filed: Mar. 9, 1999

(51) Int. Cl.[7] .............................. H04K 1/00; H04L 9/00; H04L 9/30
(52) U.S. Cl. ....................... 380/270; 380/30; 713/168
(58) Field of Search ................... 380/30, 270; 713/168

(56) References Cited

U.S. PATENT DOCUMENTS

| | | | | |
|---|---|---|---|---|
| 4,200,770 A | | 4/1980 | Hellman et al. ............... 380/30 |
| 4,306,111 A | | 12/1981 | Lu et al. ....................... 380/30 |
| 4,405,829 A | | 9/1983 | Rivest et al. .................. 380/30 |
| 4,688,250 A | | 8/1987 | Corrington et al. ........... 380/23 |
| 4,887,296 A | | 12/1989 | Horne .......................... 380/21 |
| 5,144,667 A | | 9/1992 | Pogue, Jr. et al. ............ 380/45 |
| 5,153,919 A | * | 10/1992 | Reeds, III et al. |
| 5,159,633 A | | 10/1992 | Nakamura .................... 380/30 |
| 5,371,794 A | | 12/1994 | Diffie et al. .................. 380/21 |
| 5,402,490 A | * | 3/1995 | Mihm, Jr. ..................... 380/30 |
| 5,675,653 A | | 10/1997 | Nelson, Jr. ................... 380/28 |
| 5,724,428 A | | 3/1998 | Rivest ......................... 380/37 |
| 5,745,578 A | | 4/1998 | Hassan et al. ................ 380/44 |
| 5,748,734 A | | 5/1998 | Mizikovsky .................. 380/21 |
| 6,013,913 A | * | 2/2000 | Hassan et al. ................ 380/44 |
| 6,021,197 A | * | 2/2000 | Von Willich et al. ......... 380/30 |
| 6,188,869 B1 | * | 2/2001 | Chan ......................... 455/3.1 |
| 6,225,888 B1 | * | 5/2001 | Juopperi ...................... 380/30 |
| 6,253,326 B1 | * | 6/2001 | Lincke et al. ............... 713/201 |
| 6,289,453 B1 | * | 9/2001 | Walker et al. ................ 380/30 |

FOREIGN PATENT DOCUMENTS

| | | |
|---|---|---|
| EP | 0 232 043 | 8/1987 |
| GB | 2278518 | 11/1994 |
| GB | 2279541 | 1/1995 |
| WO | WO 93/1161 | 6/1993 |

OTHER PUBLICATIONS

IBM technical disclosure Bulletin, Data encryption algorithm key distribution via public key algorithm 1985, IBM, vol. 28 No. 3, pp. 1065–1069.*

"*A Method for Obtaining Digital Signatures and Public–Key Cryptosystems*" by R.L. Shivest, A. Shamir, and L. Adleman, *Communications of the ACM*, vol. 21, No. 2, Feb. 1978, pp. 120–126.

"*Data Encryption Algorithm Key Distribution Via Public Key Algorithm*", *IBM Technical Disclosure Bulletin*, vol. 28, No. 3, Aug. 1985, pp. 1065–1069.

"ID Based Public Key Cryptosystems Based on Okamoto and Tanaka's ID Based One Way Communication Scheme", *Electronics Letters*, vol. 26, No. 10, May 10, 1990, pp. 666–668.

* cited by examiner

Primary Examiner—Thomas R. Peeso
Assistant Examiner—Kambiz Zand
(74) Attorney, Agent, or Firm—Richard C. Litman

(57) ABSTRACT

A secure satellite communications system for mobile users. The secure satellite communications system includes an orbiting communications satellite which performs the function of relaying communications to and from a plurality of earth stations. The secure satellite communications system provides a public key system for satellite communications systems to establish private communications. Communications messages are sent by a transmitting earth station encrypted by a public encryption procedure for a particular receiving earth station. The public encryption procedures are broadcast along with other system status and operational information on a common signaling broadcast channel. The receiving earth station utilizes a private decryption procedure to decrypt the received communications messages. The receiving earth station also validates the transmitted communications messages received by the receiving earth station by utilizing a cyclic redundancy check on the received communications messages.

11 Claims, 3 Drawing Sheets

SECURE SATELLITE COMMUNICATIONS SYSTEM

BACKGROUND OF THE INVENTION

1. Field of the Invention

The present invention relates to a secure satellite communications system that provides private communications by utilizing public encryption procedures and private decryption procedures.

2. Description of the Related Art

"Satellite communications" refers to communications via an orbiting communications satellite. In active satellite communications systems, a transponder-equipped satellite is positioned in a geostationary orbit to provide broadcast, navigation, communications, or similar services to a service area or areas. A service area is defined as the geographic region in which an earth station can receive signals from or send signals to the satellite economically. The satellite carries communications equipment that relays signals to and from ground stations while the satellite orbits high above earthbound relay stations. Broad coverage results and that attracts mobile service where users may roam over a service area as large as the continental United States.

Existing mobile satellite communications networks provide very good communications capabilities to their users but not much communications security. Parties other than the mobile satellite communications network users and their intended correspondents can easily intercept the radio signals carrying the communications and extract the content carried by those signals. The minimal security features of a typical mobile satellite communications network are (1) separate over-the-air IDs for the forward direction (to the mobile user) and return direction (from the mobile user) and (2) scrambling used for single carrier per channel communications in the forward direction (because the forward direction downlink is available over a large portion of the earth's surface and since it is intended for mobile terminals with small antennas it is a high power transmission from the satellite and thus relatively easy to receive).

The communications security shortcomings of a typical mobile satellite communications network are (1) single carrier per channel communications in the return direction use only a "default" scrambling vector, thus no coding security is afforded in the return direction; (2) no security of the data broadcast on the common signaling channel is provided; (3) no security is given to the return direction slotted-ALOHA call request channels; (4) a party that can receive both forward and return direction satellite downlinks can use the information extracted from the return direction to "decode" the forward direction traffic and thus listen to both sides of the call; and, (5) even if the mobile satellite communications network user uses end-to-end encryption (such as STU-III) certain call information such as the service address (telephone number) called and the over-the-air terminal IDs are not protected and thus vulnerable to analysis.

The related art is represented by the following patents of interest.

U.S. Pat. No. 4,200,770, issued on Apr. 29, 1980 to Martin E. Hellman et al., describes a cryptographic apparatus and method. Hellman et al. do not suggest a secure satellite communications system according to the claimed invention.

U.S. Pat. No. 4,306,111, issued on Dec. 15, 1981 to Shyue-Ching Lu et al., describes a public-key cryptosystem. Lu et al. do not suggest a secure satellite communications system according to the claimed invention.

U.S. Pat. No. 4,405,829, issued on Sep. 20, 1983 to Ronald L. Rivest et al., describes a public-key cryptosystem. Rivest et al. do not suggest a secure satellite communications system according to the claimed invention.

U.S. Pat. No. 4,688,250, issued on Aug. 18, 1987 to Donald G. Corrington et al., describes a method and apparatus for effecting a key change via a cryptographically protected link. Corrington et al. do not suggest a secure satellite communications system according to the claimed invention.

U.S. Pat. No. 4,887,296, issued on Dec. 12, 1989 to Donald R. Horne, describes a cryptographic system for a direct broadcast satellite system. Horne does not suggest a secure satellite communications system according to the claimed invention.

U.S. Pat. No. 5,144,667, issued on Sep. 1, 1992 to Russell W. Pogue, Jr. et al., describes a method of positively authenticating a remote unit through cryptographic techniques. Pogue, Jr. et al. do not suggest a secure satellite communications system according to the claimed invention.

U.S. Pat. No. 5,159,633, issued on Oct. 27, 1992 to Kenji Nakamura, describes a multimedia network system. Nakamura does not suggest a secure satellite communications system according to the claimed invention.

U.S. Pat. No. 5,371,794, issued on Dec. 6, 1994 to Whitfield Diffie et al., describes a method and apparatus for providing a secure communication link between a mobile wireless data processing device and a base (fixed node) data processing device which is coupled to a network. Diffie et al. do not suggest a secure satellite communications system according to the claimed invention.

U.S. Pat. No. 5,675,653, issued on Oct. 7, 1997 to Douglas V. Nelson, Jr., describes a real time digital encryption system. Nelson, Jr. does not suggest a secure satellite communications system according to the claimed invention.

U.S. Pat. No. 5,724,428, issued on Mar. 3, 1998 to Ronald L. Rivest, describes a block encryption algorithm with data-dependent rotations. Rivest does not suggest a secure satellite communications system according to the claimed invention.

U.S. Pat. No. 5,745,578, issued on Apr. 28, 1998 to Amer Aref Hassan et al., describes a method and apparatus for establishing a key sequence for secure communication through a communication channel between a first transceiver and a second transceiver. Hassan et al. do not suggest a secure satellite communications system according to the claimed invention.

U.S. Pat. No. 5,748,734, issued on May 5, 1998 to Semyon Mizikovsky, describes a circuit and method for generating cryptographic keys. Mizikovsky does not suggest a secure satellite communications system according to the claimed invention.

European Patent document 0 232 043, published on Aug. 12, 1987, describes a method and apparatus for scrambling a digital signal. European '043 does not suggest a secure satellite communications system according to the claimed invention.

Great Britain Patent document 2,278,518, published on Nov. 30, 1994, describes a method and apparatus for establishing an encrypted data transfer link between a transmitter and a receiver. Great Britain '518 does not suggest a secure satellite communications system according to the claimed invention.

Great Britain Patent document 2,279,541, published on Jan. 4, 1995, describes an authentication system for a mobile communication system. Great Britain '541 does not suggest a secure satellite communications system according to the claimed invention.

International Patent document WO 93/1161, published on Jun. 10, 1993, describes an encryption system for transmitting confidential data from a transmitting device. International '161 does not suggest a secure satellite communications system according to the claimed invention.

Japan Patent document 2-248131, published on Oct. 3, 1990, describes a key sharing method based on identification information. Japan '138 does not suggest a secure satellite communications system according to the claimed invention.

Japan Patent document 3-82237, published on Apr. 8, 1991, describes an open public key cryptographic signal verification system. Japan '237 does not suggest a secure satellite communications system according to the claimed invention.

Japan Patent document 3-169138, published on Jul. 22, 1991, describes a key sharing method based on identification information. Japan '138 does not suggest a secure satellite communications system according to the claimed invention.

An article entitled *"A METHOD FOR OBTAINING DIGITAL SIGNATURES AND PUBLIC-KEY CRYPTOSYSTEMS"* by R. L. Shivest, A. Shamir, and L. Adleman, published in February, 1978, in *Communications of the ACM,* Vol. 21, No. 2, pp. 120–126, describes a public key cryptosystem. This article does not suggest a secure satellite communications system according to the claimed invention.

An article entitled *"DATA ENCRYPTION ALGORITHM KEY DISTRIBUTION VIA PUBLIC KEY ALGORITHM"*, published in August, 1985 in *IBM Technical Disclosure Bulletin,* Vol. 28, No. 3, pp. 1065–1069, describes a data encryption algorithm key distribution in a satellite network using a public key algorithm. This article does not suggest a secure satellite communications system according to the claimed invention.

An article entitled *"ID BASED PUBLIC KEY CRYPTOSYSTEMS BASED ON OKAMOTO TANAKA'S ID BASED ONE WAY COMMUNICATION SCHEME"*, published on May 10, 1990 in *Electronics Letters,* Vol. 26, No. 10, pp. 666–668, describes a public key cryptosystem. This article does not suggest a secure satellite communications system according to the claimed invention.

None of the above inventions and patents, taken either singularly or in combination, is seen to describe the instant invention as claimed.

SUMMARY OF THE INVENTION

The present invention is a secure satellite communications system for mobile users. The secure satellite communications system constructed according to the present invention generally includes an orbiting communications satellite. The satellite performs the function of relaying communications to and from a plurality of earth stations. The earth stations may take any of various forms. In other words, the earth stations are intended to include any of various forms of stations, whether fixed, portable, or mobile.

The secure satellite communications system provides a public key system for satellite communications systems to establish private communications. Communications messages are sent by a transmitting earth station encrypted by a public encryption procedure for a particular receiving earth station. The intended receiving earth station receives the transmitted communications messages and utilizes a private decryption procedure to decrypt the received communications messages.

The public encryption procedure may be implemented in a transmitter at a stage just before the modulator and the private decryption procedure may be implemented in a receiver at a stage just after the demodulator. The coding/decoding functions act on bit streams that already exist in satellite communications equipment and would add little, if any, delay to the signal path. Each earth station in the mobile satellite communications network ignores those messages which are not addressed to it or which fail a cyclic redundancy check for validity. Those communications messages encoded with the receiving party's public encryption procedure and decoded with the corresponding private decryption procedure are received and processed as normal. All other messages are just ignored as if they contain errors which cause the cyclic redundancy check to fail. Each earth station also includes a communications message path which bypasses the private decryption procedure so that unencrypted communications messages may still be received.

Each authorized earth station in the secure satellite communications network has a private decryption procedure and a public encoding procedure. The public encryption procedure is published in a directory (database) available to all other earth stations that make up the secure satellite communications network. Any communications traffic sent from one network earth station to another requires the sending earth station to encrypt the communications traffic with the receiving party's public encryption procedure. Once encrypted in this way, only the intended recipient can decrypt the communications traffic. The encrypted communications traffic is of the same length as the non-encrypted traffic that it replaces. Additionally, the receiving party can also be confident of the identity of the sending party because of the authentication properties of the public encryption procedure algorithm.

In most mobile satellite communications network situations mobile earth stations only communicate over the air with a fixed earth station. There are typically very few fixed stations serving many mobile stations. Since there are few fixed land stations, the public encryption procedures for each fixed land station may be broadcast along with other system status and operational information on the common signaling broadcast channel's bulletin board. The public encryption procedures for the mobile earth stations may be stored at the fixed earth stations as an additional field in the database that currently list authorized mobile terminals' forward and return IDs along with terrestrial telephone IDs.

Accordingly, it is a principal object of the invention to provide a secure satellite communications system that provides private communications by utilizing public encryption procedures and private decryption procedures.

It is an object of the invention to provide improved elements and arrangements thereof in a secure satellite communications system for mobile users for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
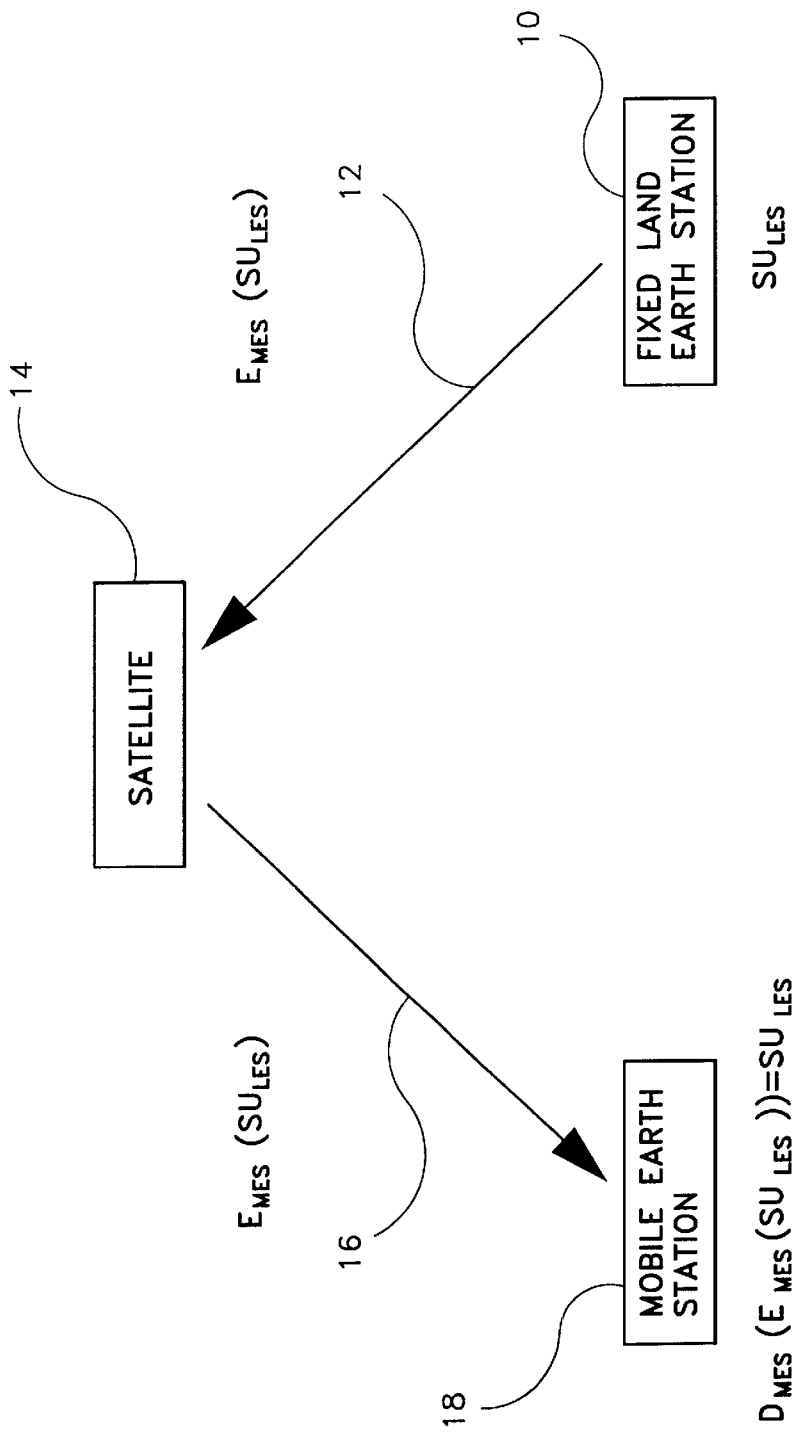
FIG. 1 is a block diagram showing the transmission of a communications signal sent over air from a fixed land earth station to a mobile earth station according to the invention.

A secure satellite communications system constructed according to the present invention generally includes an orbiting communications satellite. The satellite performs the function of relaying communications to and from a plurality of earth stations. The earth stations may take any of various forms. In other words, the earth stations are intended to include any of various forms of stations, whether fixed, portable, or mobile.

The secure satellite communications system provides a public key system for satellite communications systems to establish private communications. Communications messages are sent by a transmitting earth station encrypted by a public encryption procedure for a particular receiving earth station. The intended receiving earth station utilizes a private decryption procedure to decrypt the received communications messages.

The encryption procedure may be implemented in a transmitter at a stage just before the modulator and the decryption procedure may be implemented in a receiver at a stage just after the demodulator. The coding/decoding functions act on bit streams that already exist in satellite communications equipment and would add little, if any, delay to the signal path. Each earth station in the mobile satellite communications network ignores those messages which are not addressed to it or which fail a cyclic redundancy check for validity. Those communications messages encoded with the receiving party's public encryption procedure and decoded with the corresponding private decryption procedure are received and processed as normal. All other messages are just ignored as if they contain errors which cause the cyclic redundancy check to fail. Each earth station also includes a communications message path which bypasses the private decryption procedure so that unencrypted messages may still be received.

Each authorized earth station in the secure satellite communications network has a private decryption procedure and a public encryption procedure. The public encryption procedure is published in a directory (database) available to all other earth stations that make up the secure satellite communications network. Any communications traffic sent from one network earth station to another requires the sending earth station to encrypt the communications traffic with the receiving party's public encryption procedure. Once encrypted in this way, only the intended recipient can decrypt traffic. The encrypted traffic is of the same length as the non-encrypted traffic that it replaces. Additionally, the receiving party can also be confident of the identity of the sending party because of the authentication properties of the public encryption procedure algorithm.

In most mobile satellite communications network situations mobile earth stations only communicate over the air with a fixed earth station. There are typically very few fixed stations serving many mobile stations. Since there are few fixed land stations, the public encryption procedures for each fixed land station may be broadcast along with other system status and operational information on the common signaling broadcast channel's bulletin board. The public encryption procedures for the mobile earth stations may be stored at the fixed earth stations as an additional field in the database that currently list authorized mobile terminals' forward and return IDs along with terrestrial telephone IDs.

As shown in FIG. 1, $SU_{LES}$ is a communications signal unit sent over the air 12,16 from a fixed land earth station 10 to a mobile earth station 18. The fixed land earth station 10 utilizes an encryption procedure $E_{MES}$ to encrypt a communications message to the mobile earth station 18. The mobile earth station 18 employs a decryption procedure $D_{MES}$ to decrypt a communications message received from the satellite 14. To prepare a communications signal unit, $SU_{LES}$, for secure transmission to a mobile earth station 18 from a fixed land earth station 10, the fixed land earth station 10 executes encryption procedure $E_{MES}$ on $SU_{LES}$ to yield encrypted communications message $E_{MES}(SU_{LES})$.

The encrypted communications message $E_{MES}(SU_{LES})$ gets sent via the satellite 14 and received by all mobile earth stations which are in the network served by the satellite 14 chosen by the fixed land earth station 10. All of the mobile earth stations which receive the encrypted communications message $E_{MES}(SU_{LES})$ apply their particular decryption procedure $D_{MES}$ to the received encrypted communications message $E_{MES}(SU_{LES})$. Only the mobile earth station 18 whose decryption procedure $D_{MES}$ corresponds to the encryption procedure $E_{MES}$ chosen by the fixed land earth station 10 obtains a valid result, that is $SU_{LES}$: $D_{MES}(E_{MES}(SU_{LES}))=SU_{LES}$.

$SU_{LES}$ is validated by the mobile earth station 18 by the existing process of checksum calculation and comparison. Invalid communications signal units such as those which would result from applying a non-corresponding decryption procedure $D_{MES}$ get ignored, because the checksum calculation and comparison "fails". To establish communications with any other mobile earth station, the fixed earth station would execute an encryption procedure associated with the intended mobile earth station. The intended mobile earth station would utilize its own decryption procedure to decrypt the received communications message.

Figure 2:
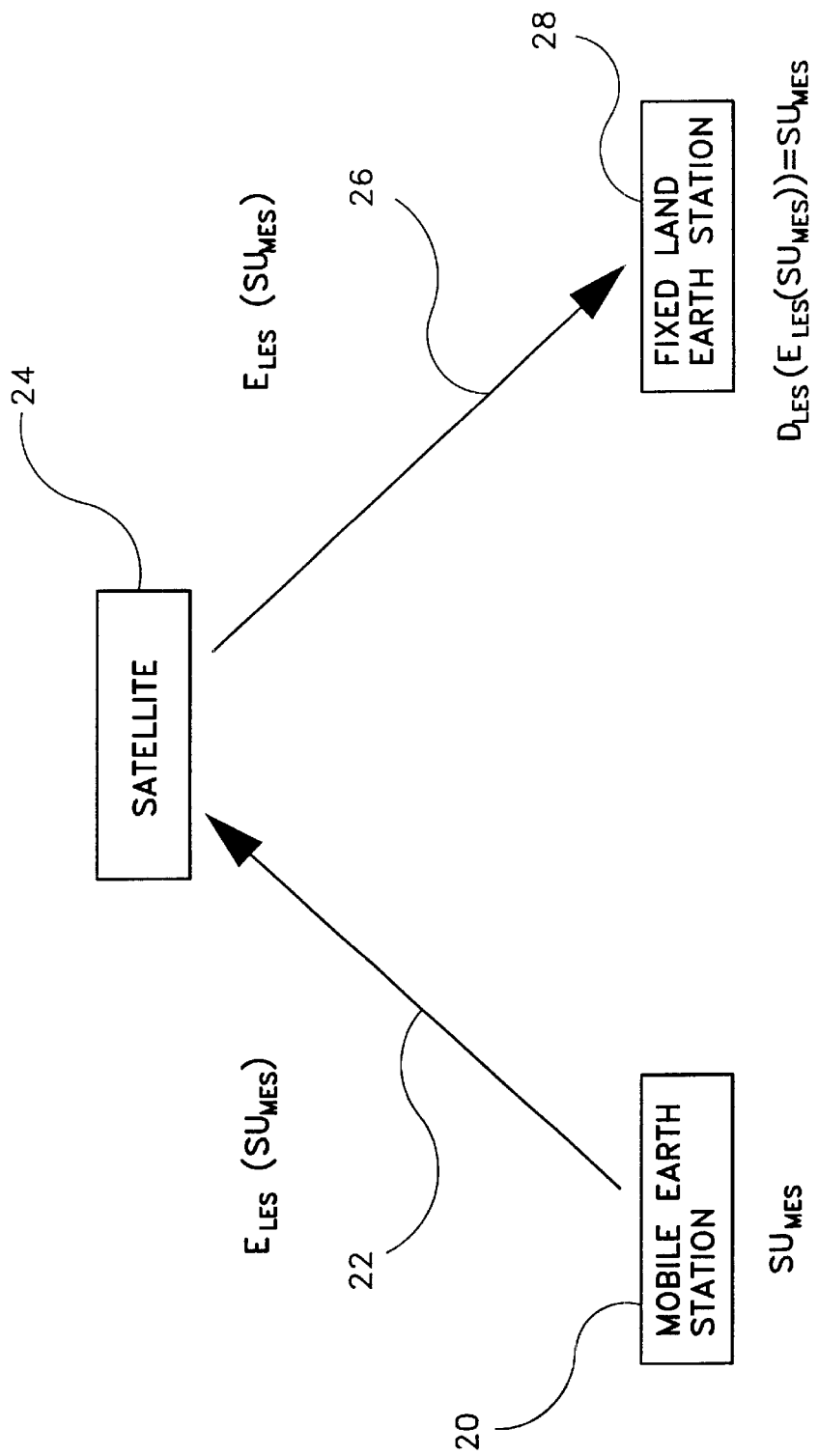
FIG. 2 is a block diagram showing the transmission of a communications signal sent over air from a mobile earth station to a fixed land earth station according to the invention.

As shown in FIG. 2, $SU_{MES}$ is a communications signal unit sent over the air 22,26 from a mobile earth station 20 to a fixed land earth station 28. The mobile earth station 20 utilizes an encryption procedure $E_{LES}$ to encrypt a communications message to the fixed land earth station 28. The fixed land earth station 28 employs a decryption procedure $D_{LES}$ to decrypt a communications message received from the satellite 24. To prepare a communications signal unit, $SU_{MES}$, for secure transmission to a fixed land earth station 28 the mobile earth station 20 executes encryption procedure $E_{LES}$ on $SU_{MES}$ to yield encrypted communications message $E_{LES}(SU_{MES})$.

The encrypted communications message $E_{LES}(SU_{MES})$ is sent via the satellite 24 and received by all fixed land earth stations which are in the network served by the satellite 24 chosen by the mobile earth station 20. All of the fixed land earth stations which receive the encrypted communications message $E_{LES}(SU_{MES})$ apply their particular decryption procedure $D_{LES}$ to $E_{LES}(SU_{MES})$. Only the fixed land earth station 28 whose decryption procedure $D_{LES}$ corresponds to the encryption procedure $E_{LES}$ chosen by the mobile earth station 20 obtains a valid result, that is $SU_{MES}$: $D_{LES}(E_{LES}(SU_{MES}))=SU_{MES}$.

$SU_{MES}$ is validated by the fixed land earth station 28 by the existing process of checksum calculation and comparison. Invalid communications signal units such as those which would result from applying a non-corresponding $D_{LES}$ get ignored, because the checksum calculation and comparison "fails". To establish communications with any other fixed land earth station, the mobile earth station would execute an encryption procedure associated with the intended fixed land earth station. The intended fixed land earth station would utilize its own decryption procedure to decrypt the received communications message.

Figure 3:
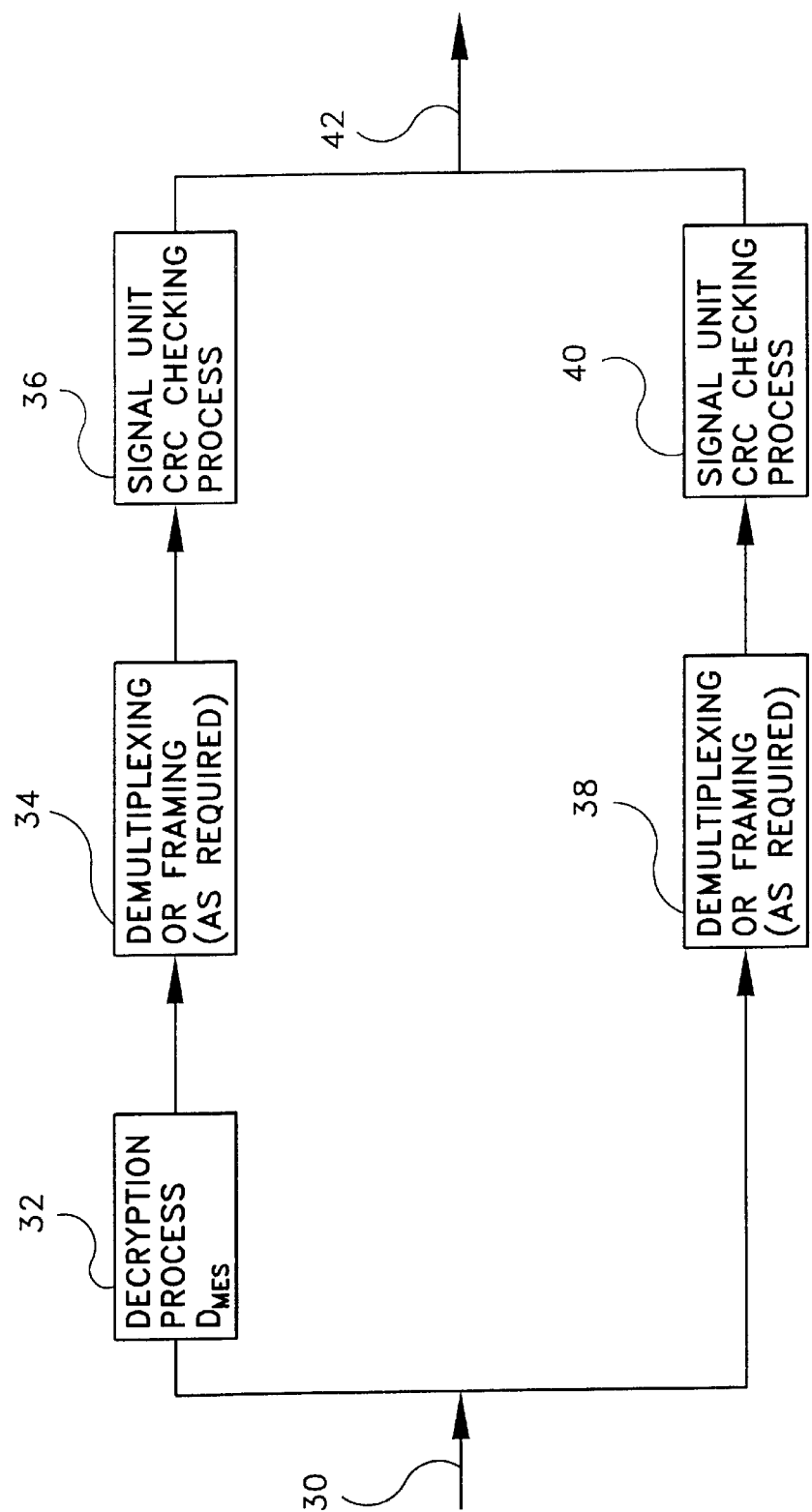
FIG. 3 is a block diagram showing two parallel reception paths according to the invention in an earth station.

As shown in FIG. 3, a communications message signal 30 received by an earth station passes through a communications message path which decrypts the received communications message with the earth station's private decryption procedure 32. The decrypted received communications message is then demultiplexed or framed 34 according to the particular requirements of the earth station. After demultiplexing or framing the received communications signal is submitted to a cyclic redundancy check 36 for testing its validity. The communications signal 42 is ignored by the earth station if it fails the cyclic redundancy check. As shown the received communications message signal 30 also passes through a communications message path which bypasses the earth station's private decryption procedure so that unencrypted communications messages may still be received. In this case the received communications message signal 30 is demultiplexed or framed 38 according to the particular requirements of the earth station. After demultiplexing or framing the received communications signal is submitted to a cyclic redundancy check 40 for testing its validity. The communications signal 42 is ignored by the earth station if it fails the cyclic redundancy check 40.

It is to be understood that the present invention is not limited to the embodiment described above, but encompass any and all embodiments within the scope of the following claims.

I claim:

1. A satellite communications system comprising:
   an orbiting communications satellite configured to relay a plurality of communications messages to and from a plurality of stations, the communications messages each having a data content;
   a first station of the plurality of stations; and
   a second station of the plurality of stations, the second station including an internal secure signal processing path and an internal non-secure signal processing path in parallel,
   wherein the first and second stations are each configured to transmit and receive at least one of the plurality of communications messages, and wherein the first station transmits one communications message of the plurality of communications messages and the second station receives, processes, and validates the one communications message in both the secure signal processing path and the non-secure signal processing path, and ignores the one communications message if the message fails validation in both the secure signal processing path and the non-secure signal processing path, the data content of the one communications message in the secure signal processing path and the non-secure signal processing path being identical.

2. The satellite communications system according to claim 1, wherein the stations are fixed, portable, or mobile.

3. The satellite communications system according to claim 1, wherein the second station validates the one communications message transmitted by the first station by utilizing a cyclic redundancy check on the one communications message.

4. The satellite communications system according to claim 1, wherein at least one station public encryption procedure is broadcast along with other system status and operational information on a common signaling broadcast channel.

5. The satellite communications system according to claim 1, wherein the secure signal processing path utilizes an encryption/decryption technique to secure information content of a communications message.

6. The satellite communications system according to claim 1, wherein the encryption/decryption technique is a public key encryption/private key decryption technique.

7. A method of communications in a satellite communications system, the method comprising:
   providing an orbiting communications satellite configured to relay a plurality of communications messages to and from a plurality of stations, the communications messages each having a data content;
   providing a first station from the plurality of stations;
   providing a second station from the plurality of stations, the second station including an internal secure signal processing path and an internal non-secure signal processing path in parallel;
   configuring each of the first and second stations to transmit and receive at least one of the plurality of communications messages;
   transmitting one communications message of the plurality of communications messages from the first station; and,
   receiving, processing, and validating the one communications message in both the secure signal processing path and the non-secure signal processing path in the second station, and ignoring the one communications message if the message fails validation in both the secure signal processing path and the non-secure signal processing path, the data content of the one communications message in the secure signal processing path and the non-secure signal processing path being identical.

8. The method according to claim 7, wherein the one communications message transmitted by the first station is validated by the second station by utilizing a cyclic redundancy check on the received communications message.

9. The method according to claim 7, further comprising the step of broadcasting at least one station public encryption procedure along with other system status and operational information on a common signaling broadcast channel.

10. The method according to claim 7, further comprising the step of having the secure signal processing path utilize an encryption/decryption technique to secure information content of a communications message.

11. The method according to claim 10, wherein the encryption/decryption technique is a public key encryption/private key decryption technique.

* * * * *